(12) United States Patent
Gordon

(10) Patent No.: US 11,708,860 B2
(45) Date of Patent: Jul. 25, 2023

(54) CONSTANT VELOCITY HOUSING LOCK SYSTEM

(71) Applicant: Robby Gordon, Charlotte, NC (US)

(72) Inventor: Robby Gordon, Charlotte, NC (US)

( * ) Notice: Subject to any disclaimer, the term of this patent is extended or adjusted under 35 U.S.C. 154(b) by 378 days.

(21) Appl. No.: 16/779,394

(22) Filed: Jan. 31, 2020

(65) Prior Publication Data
US 2020/0248750 A1 Aug. 6, 2020

Related U.S. Application Data

(60) Provisional application No. 62/801,264, filed on Feb. 5, 2019.

(51) Int. Cl.
| | | |
|---|---|---|
| *F16D 3/06* | (2006.01) | |
| *F16D 3/227* | (2006.01) | |
| *F16D 3/223* | (2011.01) | |
| *F16D 1/116* | (2006.01) | |

(52) U.S. Cl.
CPC .............. *F16D 3/06* (2013.01); *F16D 3/227* (2013.01); *F16D 1/116* (2013.01); *F16D 2003/22323* (2013.01); *F16D 2003/22326* (2013.01); *Y10S 464/906* (2013.01); *Y10T 403/598* (2015.01); *Y10T 403/599* (2015.01)

(58) Field of Classification Search
CPC . F16D 3/06; F16D 3/227; F16D 1/116; F16D 2003/22326; F16D 2001/103; Y10S 464/906; Y10T 403/598; Y10T 403/599
USPC .......................... 464/146, 182; 403/324, 325
See application file for complete search history.

(56) References Cited

U.S. PATENT DOCUMENTS

| | | | | |
|---|---|---|---|---|
| 7,140,277 B1 * | 11/2006 | Chern | ................. | B25B 23/0021 |
| | | | | 403/324 |
| 8,388,457 B2 * | 3/2013 | Keller | ..................... | F16D 3/223 |
| | | | | 464/146 |
| 11,028,883 B2 * | 6/2021 | Olason | ................... | B60K 17/35 |

FOREIGN PATENT DOCUMENTS

| | | | | | |
|---|---|---|---|---|---|
| SU | | 218569 | * | 5/1968 | .................... 464/182 |
| SU | | 240631 | * | 4/1969 | .................... 464/182 |

* cited by examiner

*Primary Examiner* — Greg Binda
(74) *Attorney, Agent, or Firm* — Berry Choobin; Patent 360

(57) ABSTRACT

A constant velocity housing is provided to couple a plunging CV joint with a transaxle. The constant velocity comprises an elongate housing configured to retain the plunging CV joint and a splined shaft configured to engage with a transaxle. A locking system removably retains the splined shaft within the transaxle. The locking system comprises a lock pin in mechanical communication with pins slidably retained within radial holes disposed in the splined shaft underneath a snap-ring. An actuator moves the lock pin to push the pins to operably change a diameter of the snap-ring. When the actuator is loosened, the snap-ring constricts to a diameter less than the diameter of the splined shaft, allowing removal of the splined shaft from the transaxle. When the actuator is fully tightened, the snap-ring assumes a diameter greater than the diameter of the splined shaft, such that the spline shaft remains engaged with the transaxle.

6 Claims, 3 Drawing Sheets

CONSTANT VELOCITY HOUSING LOCK SYSTEM

PRIORITY

This application claims the benefit of and priority to U.S. Provisional Application, entitled "Constant Velocity Housing Lock System," filed on Feb. 5, 2019 and having application Ser. No. 62/801,264, the entirety of said application being incorporated herein by reference.

FIELD

Embodiments of the present disclosure generally relate to the field of vehicle drivetrains. More specifically, embodiments of the disclosure relate to a constant velocity housing lock system.

BACKGROUND

Trailing arm suspensions are well known and commonly used in heavy-duty vehicles, such as semi tractor-trailer configurations, as well as off-road vehicles such as four-wheeled buggies. A typical trailing arm suspension comprises a trailing arm having one end pivotally connected to a vehicle frame through a frame bracket and another end connected to the vehicle frame by a spring or strut. The trailing arm generally supports an axle to which the vehicle wheels are mounted. Road-induced reaction forces acting on the wheels are controlled by the pivoting of the trailing arm in response to these forces, with the forces being resisted by the spring.

Constant velocity (CV) joints allow pivoting of the trailing arm while a drive shaft coupled to the CV joint delivers power to the wheels at constant rotational speeds. Although CV joints are typically used in front wheel drive vehicles, off-road vehicles such as four-wheeled buggies comprise CV joints at all wheels. Constant velocity joints typically are protected by a rubber boot and filled with molybdenum disulfide grease.

Given that off-road vehicles routinely travel over very rough terrain, such as mountainous regions, there is a desire to improve the mechanical strength and performance of off-road drivetrain and suspension systems, while at the same reducing the mechanical complexity of such systems.

SUMMARY

An apparatus for a constant velocity housing is provided for coupling a constant velocity joint with a transaxle. The constant velocity housing comprises an elongate housing configured to retain a plunging constant velocity joint. A splined shaft is coupled with the elongate housing and configured to be engaged with the transaxle. A snap-ring is disposed within a circumferential recess at an end of the splined shaft. A lock pin is slidably retained within the splined shaft and in mechanical communication with the snap-ring. An actuator is in mechanical communication with the lock pin. Tightening the actuator causes the lock pin to expand the snap-ring to a diameter that is greater than the diameter of the splined shaft, whereby the constant velocity housing is retained in the transaxle. Loosening the actuator causes the lock pin to allow the snap-ring to constrict to a diameter that is less than the diameter of the splined shaft, thereby allowing the constant velocity housing to be decoupled from the transaxle.

In an exemplary embodiment, a constant velocity housing to couple a constant velocity joint with a transaxle comprises: an elongate housing configured to retain a plunging constant velocity joint; a splined shaft coupled with the elongate housing; a snap-ring disposed within a circumferential recess at an end of the splined shaft; a lock pin slidably retained within the splined shaft and in mechanical communication with the snap-ring; and an actuator in mechanical communication with the lock pin.

In another exemplary embodiment, the splined shaft is configured to be received into the transaxle, such that torque may be transferred from the transaxle to the elongate housing. In another exemplary embodiment, the recess and the snap-ring are configured to cooperate to retain the splined shaft in the transaxle.

In another exemplary embodiment, a concentric hole extends along the length of the splined shaft and slidably retains the lock pin. In another exemplary embodiment, a cylindrical spring disposed at a terminal end of the concentric hole is configured to bias the lock pin toward the end of the splined shaft. In another exemplary embodiment, a multiplicity of radial holes are arranged around the circumferential recess, each of the multiplicity of radial holes extending from the concentric hole to the circumferential recess and slidably receiving a pin. In another exemplary embodiment, the multiplicity of radial holes comprises four radial holes arranged at 90-degree intervals around the circumferential recess.

In another exemplary embodiment, the lock pin is a generally elongate member configured to move within a concentric hole extending along the length of the splined shaft and comprising a first narrow portion and a second narrow portion that share an intervening shaft portion. In another exemplary embodiment, the first narrow portion is configured to be engaged by the actuator; and wherein the second narrow portion is configured to move one or more pins that are slidably retained within radial holes extending from the concentric hole to the circumferential recess. In another exemplary embodiment, the actuator includes threads configured to engage with similar threads disposed within a threaded hole that extends from the concentric hole to an exterior of the constant velocity housing. In another exemplary embodiment, a rounded end comprising the actuator is configured to engage with the first narrow portion while a cylindrical spring biases the lock pin toward the end of the splined shaft.

In another exemplary embodiment, the rounded end is configured to fully extend into the first narrow portion when the actuator is fully tightened into the threaded hole, thereby positioning the second narrow portion away from the location of the one or more pins. In another exemplary embodiment, the lock pin is configured to push the one or more pins outward within the radial holes and into contact with the snap-ring, thereby forcibly expanding the snap-ring within the circumferential recess and causing the snap-ring to assume a diameter that is greater than the diameter of the splined shaft such that the constant velocity housing may be coupled with the transaxle. In another exemplary embodiment, the rounded end is configured to move out of the first narrow portion when the actuator is loosened, thereby allowing the cylindrical spring to push the lock pin toward the end of the splined shaft such that the second narrow portion is positioned near the location of the one or more pins. In another exemplary embodiment, the second narrow portion is configured to allow the one or more pins to move deeper within the radial holes due to a compressive force of the snap-ring, thereby allowing the snap-ring to relax to a diameter that is substantially less than the diameter of the splined shaft such that the constant velocity housing may be decoupled from the transaxle.

In an exemplary embodiment, a constant velocity housing comprises: an elongate housing configured to retain a plunging constant velocity joint; a splined shaft configured to engage with a transaxle; and a locking system configured to removably retain the splined shaft within the transaxle.

In another exemplary embodiment, the locking system comprises a lock pin in mechanical communication with one or more pins slidably retained within radial holes disposed in the splined shaft underneath an expandable snap-ring. In another exemplary embodiment, an actuator is configured to move the lock pin so as to push the one or more pins within the radial holes to operably change a diameter of the expandable snap-ring. In another exemplary embodiment, the expandable snap-ring is configured to constrict to a diameter that is less than the diameter of the splined shaft when the actuator is loosened. In another exemplary embodiment, the expandable snap-ring is configured to assume a diameter greater than the diameter of the splined shaft when the actuator is fully tightened.

BRIEF DESCRIPTION OF THE DRAWINGS

The drawings refer to embodiments of the present disclosure in which.

Figure 1:
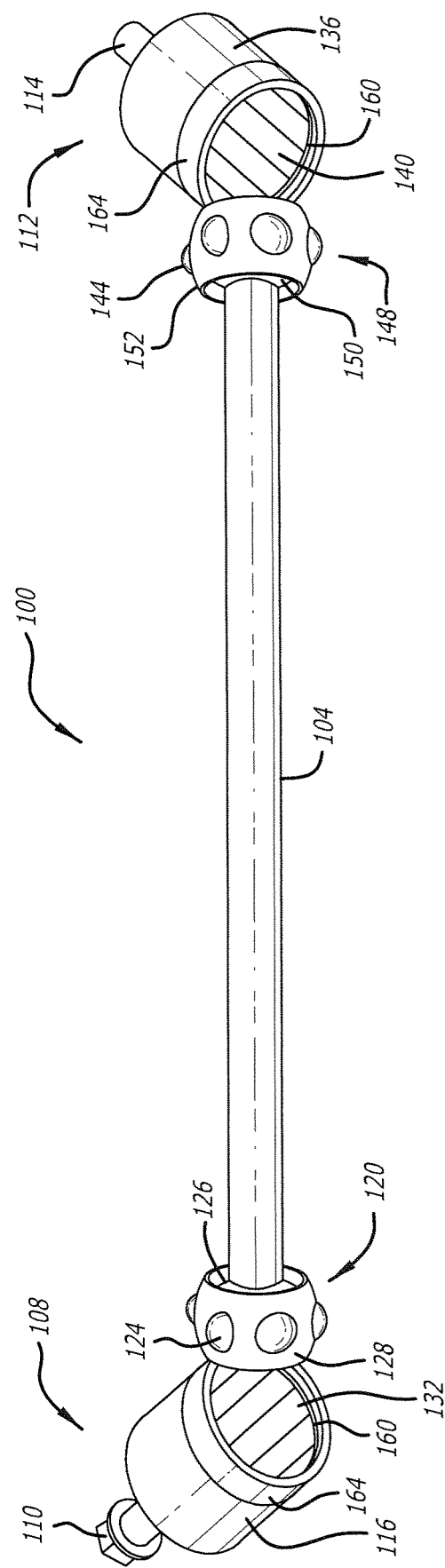
FIG. 1 illustrates a perspective view of an exemplary embodiment of a dual plunging CV drive shaft that includes a CV housing lock system in accordance with the present disclosure.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first housing," may be made. However, the specific numeric reference should not be interpreted as a literal sequential order but rather interpreted that the "first housing" is different than a "second housing." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

Constant velocity (CV) joints allow pivoting of trailing arms while drive shafts coupled to the CV joints deliver power to the wheels at constant rotational speeds. Although CV joints are typically used in front wheel drive vehicles, off-road vehicles such as four-wheeled buggies comprise CV joints at all wheels. Given that off-road vehicles routinely travel over very rough terrain, such as mountainous regions, there is a desire to improve the mechanical strength and performance of off-road drivetrain and suspension systems, while at the same reducing the mechanical complexity of such systems. Embodiments of the present disclosure provide a plunging CV housing lock system that simplifies coupling a dual plunging CV drive shaft between a transaxle and a drive wheel.

FIG. 1 illustrates a perspective view of an exemplary embodiment of a dual plunging CV drive shaft 100 that includes a housing lock system in accordance with the present disclosure. The dual plunging CV drive shaft 100 is a generally elongate assembly comprising a drive shaft 104 coupled with an outboard plunging CV joint 108 at one end and coupled with an inboard plunging CV joint 112 at an opposed end. The dual plunging CV drive shaft 100 is configured to conduct torque from a transaxle to a drive wheel of a vehicle, such as off-road or four-wheel vehicles, and accommodate the vertical pivoting motion of the suspension in response to road conditions. As such, the outboard plunging CV joint 108 comprises an axle 110 that is configured to be coupled with the drive wheel. The inboard plunging CV joint 112 comprises a splined shaft 114 that is configured to be coupled with the transaxle.

As shown in FIG. 1, the outboard plunging CV joint 108 comprises an elongate housing 116 that receives a CV joint 120 coupled with the drive shaft 104. The CV joint 120 is comprised of a plurality of balls 124 positioned uniformly around an inner race 126. The balls 124 are retained in position, at least in part, by way of a bearing cage 128. A longitudinal ball race 132 disposed inside the elongate housing 116 allows the balls 124 to move longitudinally relative to the elongate housing 116. Similarly, recesses in the inner race 126 allow the balls 124 to move longitudinally relative to the drive shaft 104. As will be appreciated, therefore, the longitudinal ball race 132 and the recesses of the inner race 126 work in concert, allowing the balls 124 to move longitudinally there between, thus accommodating various angles between the drive shaft 104 and the axle 110.

With continuing reference to FIG. 1, the inboard plunging CV joint 112 comprises an elongate housing 136 that includes the above-mentioned splined shaft 114 configured to be received into the transaxle. The elongate housing 136 includes a longitudinal ball race 140 that is configured to receive a plurality of balls 144 comprising a CV joint 148. The longitudinal ball race 140 allows the balls 144 to move longitudinally relative to the elongate housing 136. As will be appreciated, the balls 144 comprising the CV joint 148 are positioned uniformly around an inner race 150 that is engaged with the drive shaft 104. A bearing cage 152 retains the balls 144 within recesses in the inner race 150 that allow the balls to move longitudinally relative to the drive shaft 104. Thus, the longitudinal ball race 140 and the recesses of the inner race 150 cooperate to allow the balls 144 to move longitudinally between the elongate housing 136 and the inner race 126, thereby accommodating various angles between the drive shaft 104 and the splined shaft 114.

In the illustrated embodiment of FIG. 1, the elongate housings 116, 136 each includes a groove 160 formed by clearance between an edge of the elongate housings 116, 136 and an end-cap 164 that is threadably engaged with each of the elongate housings. It is contemplated that the grooves 160 are configured to receive snap-rings (not shown), such that the CV joints 120, 148 are prevented from exiting the elongate housings 116, 136 during operation of the drive shaft 104, or during extreme pivoting movements of the trailing arm. In some embodiments, the end-caps 164 each comprises a lip, or narrow portion, in lieu of the groove 160, that prevents the CV joints 120, 148 from exiting the elongate housings 116, 136.

Those skilled in the art will recognize that, similarly to conventional CV joints, the plunging CV joints 108, 112 are configured to communicate rotational forces from the transaxle to the drive wheel while a trailing arm supporting the drive wheel pivots vertically due to road conditions. Unlike conventional CV joints, however, the plunging CV joints 108, 112 are configured to allow the drive shaft 104 to "float" between the elongate housings 116, 136 as needed during extreme pivoting motion of the trailing arm. Experimentation has demonstrated that allowing the drive shaft 104 to float within the elongate housings 116, 136 advantageously eliminates binding within the suspension and drivetrain of the vehicle. The plunging CV joints 108, 112, as well as further details pertaining to the dual plunging CV drive shaft 100, are discussed in greater detail in U.S. Patent Application, entitled "Dual Plunging Constant Velocity Drive Shaft," filed on Feb. 24, 2017 and having application Ser. No. 15/442,428, now U.S. Pat. No. 10,539,192 which claims the benefit of and priority to a U.S. Provisional Application of the same title, filed on Feb. 26, 2016 and having application Ser. No. 62/300,489, both of said applications being incorporated herein by reference and made a part of this application.

Figure 2:
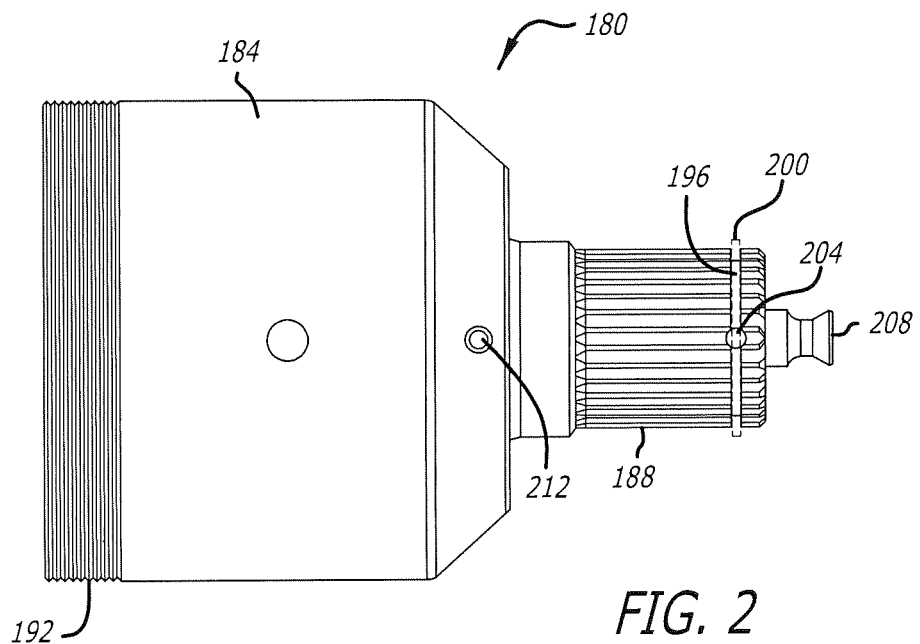
FIG. 2 illustrates a side plan view of an exemplary embodiment of a lockable CV housing, according to the present disclosure.

Turning now to FIG. 2, an exemplary embodiment of a lockable CV housing 180 is shown. The lockable CV housing 180 is substantially similar to the elongate housing 136, shown in FIG. 1, with the exception that the lockable CV housing 180 includes a locking system as described herein below. In general, the lockable CV housing 180 may be incorporated into the dual plunging CV drive shaft 100 in lieu of the elongate housing 136 so as to facilitate coupling the CV joint 112 with a transaxle. The lockable CV housing 180 includes an elongate housing 184 that is coupled with a splined shaft 188. The elongate housing 184 includes a threaded portion 192 that is configured to engage with the end-cap 164. As such, the elongate housing 184 is configured to receive and retain the CV joint 148, as described herein.

Similar to the splined shaft 114, the splined shaft 188 is configured to be received into the transaxle. As will be appreciated, the shaft 188 includes splines that are configured to engage with similar splines comprising the transaxle, whereby torque may be transferred from the transaxle to the drive wheel. The splined shaft 188 includes a recess 196 that is disposed around the circumference of the shaft and configured to receive a snap-ring 200. It is contemplated that the recess 196 and the snap-ring 200 cooperate to retain the splined shaft 188 in the transaxle. Further, one or more pins 204 are disposed within radial holes underneath the snap-ring 200 and operably coupled with a lock pin 208. Upon a practitioner loosening the lock pin 208 by way of an actuator 212, the pins 204 allow the snap-ring 200 to constrict and recede deeper into the recess 196, thereby enabling the splined shaft 188 to be inserted into or removed from the transaxle. Upon the practitioner tightening the lock pin 208, the pins 204 are pushed outwards and expand the snap-ring 200 in a radial direction with respect to the splined shaft 188. It is contemplated that engaging the expanded snap-ring 200 with components inside the transaxle operates to couple the lockable CV housing 180 with the transaxle.

Figure 3:
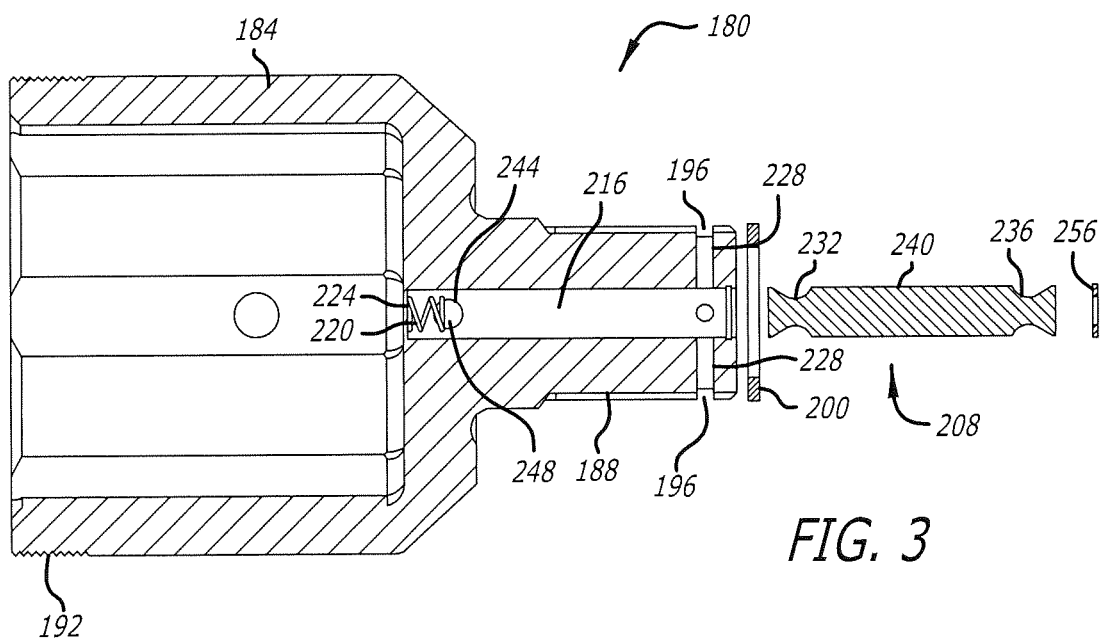
FIG. 3 illustrates an exploded cross-sectional view of the lockable CV housing of FIG. 2, taken along a midline.

FIG. 3 illustrates an exploded cross-sectional view of the lockable CV housing 180, shown in FIG. 2, taken along a midline. As shown in FIG. 3, a concentric hole 216 extends along the length of the splined shaft 188 and is configured to slidably receive the lock pin 208. A cylindrical spring 220 disposed at a terminal end 224 of the concentric hole 216 is configured to bias the lock pin 208 toward the end of the splined shaft 188 comprising the recess 196. In the illustrated embodiment of FIG. 3, a multiplicity of radial holes 228 are arranged around the circumference of the recess 196. Each of the radial holes 228 extends from the concentric hole 216 to the recess 196 and is configured to slidably receive a pin 204, discussed herein above. It is contemplated that any number of radial holes 228 may be incorporated into the splined shaft 188 and arranged at any suitable interval around the circumference of the recess 196, as deemed beneficial and without limitation. In the illustrated embodiment, however, four radial holes 228 are arranged at 90-degree intervals around the circumference of the recess 196.

With continuing reference to FIG. 3, the lock pin 208 is a generally elongate member comprising a first narrow portion 232 and a second narrow portion 236 sharing an intervening shaft portion 240. The first narrow portion 232 is configured to be engaged by the actuator 212. It is contemplated that the actuator 212 includes threads configured to engage with similar threads disposed within a threaded hole 244 that extends from the concentric hole 216 to the exterior of the lockable CV housing 180. As such, turning the actuator 212 causes a rounded end 248 of the actuator 212 to move into or recede out of the concentric hole 216. The rounded end 248 of the actuator 212 is configured to engage with the first narrow portion 232 while the cylindrical spring 220 biases the lock pin 208 toward the end of the splined shaft 188 comprising the recess 196.

Figure 4A:
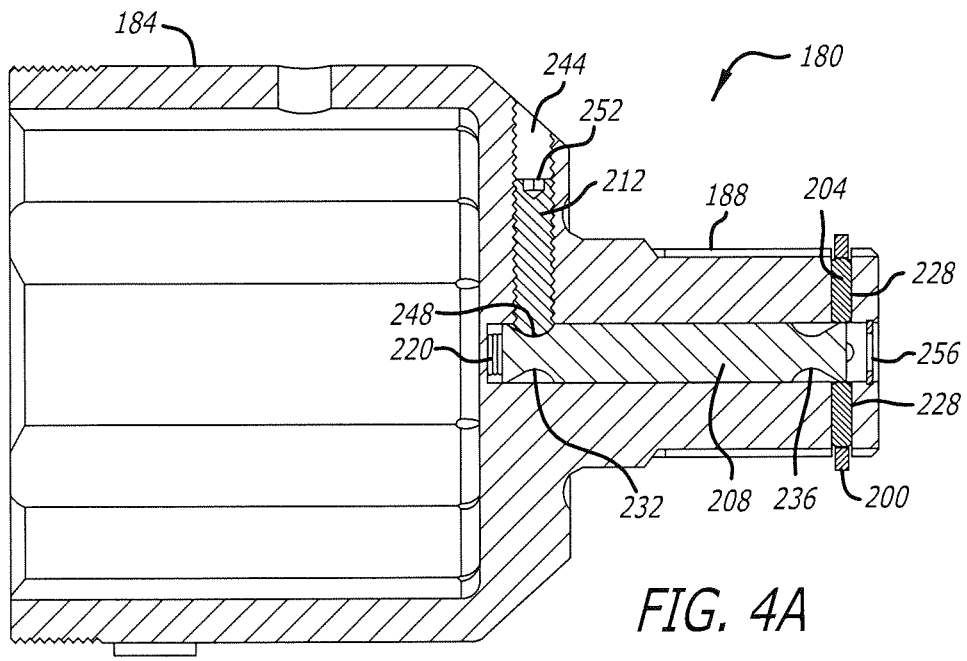
FIG. 4A illustrates a cross-sectional view of the lockable CV housing of FIG. 3 with an actuator in a fully tightened state suitable to retain the lockable CV housing coupled with a transaxle.
Figure 4B:
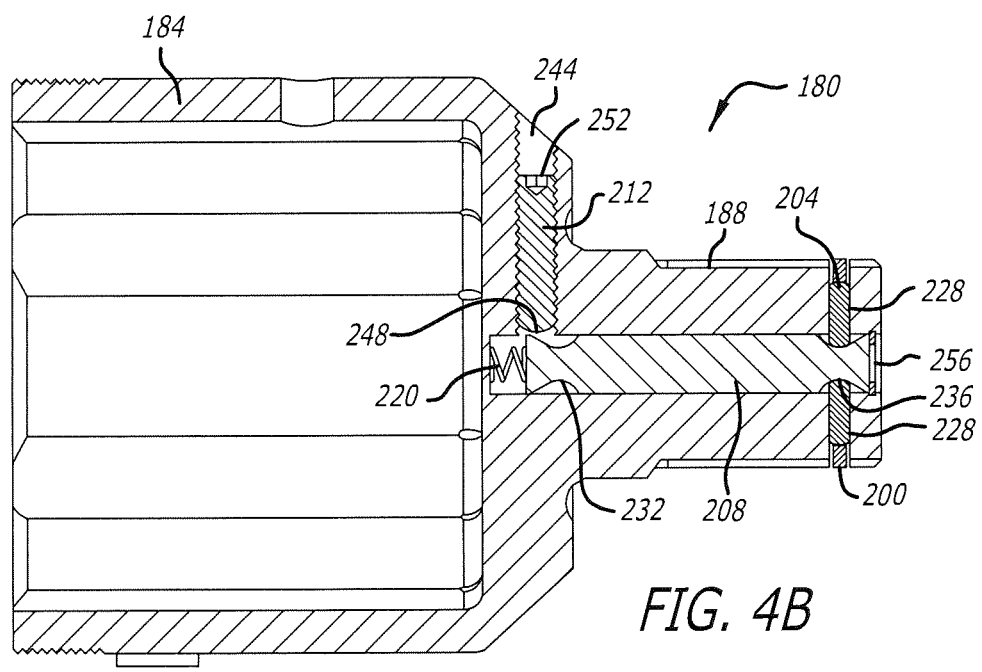
FIG. 4B illustrates a cross-sectional view of the lockable CV housing of FIG. 3 with the actuator in a loosened state suitable to allow unrestricted decoupling of the lockable CV housing coupled from the transaxle.

As best shown in FIG. 4A, the actuator 212 includes a shaped opening 252 whereby a practitioner may engage a suitable tool for turning the actuator 212 in the threaded hole 244. Upon the practitioner fully tightening the actuator 212 into the threaded hole 244, the rounded end 248 fully extends into the first narrow portion 232, thereby moving the lock pin 208 toward the terminal end 224 of the hole 216. Upon the practitioner loosening the actuator 212, as shown in FIG. 4B, the rounded end 248 moves out of the first narrow portion 232, allowing the cylindrical spring 220 to push the lock pin 208 away from the terminal end 224. A snap-ring 256 disposed near the opening of the concentric hole 216 prevents the lock pin 208 from escaping from the concentric hole 216 when the rounded end 248 is fully disengage from the first narrow portion 232.

The second narrow portion 236 of the lock pin 208 is configured to move the pins 204 within the radial holes 228 according to the operation of the actuator 212, as shown in FIGS. 4A-4B. When the rounded end 248 of the actuator 212 is tightened into the first narrow portion 232, as shown in FIG. 4A, the lock pin 208 is moved deeper into the concentric hole 216 and the second narrow portion 236 is positioned beyond the location of the radial holes 228.

Consequently, a relatively wider portion of the lock pin 208 pushes the pins 204 outward within the radial holes 228 and into contact with the snap-ring 200, discussed hereinabove. Once the rounded end 248 of the actuator 212 is fully engaged with the first narrow portion 232, the lock pin 208 forcibly expands the snap-ring 200 by way of the pins 204, causing the snap-ring 200 to assume a diameter that is greater than the diameter of the splined shaft 188. It is contemplated that fully tightening the actuator 212 to expand the snap-ring 200 may be utilized to couple the lockable CV housing 180 with the transaxle.

As best shown in FIG. 4B, upon the practitioner loosening the actuator 212 to remove the rounded end 248 from the first narrow portion 232, the cylindrical spring 220 pushes the lock pin 208 away from the terminal end 224 and toward the snap-ring 256. Contacting the snap-ring 256 prevents the lock pin 208 from exiting the concentric hole 228. As the lock pin 208 approaches the snap-ring 256, the second narrow portion 236 moves to the location of the pins 204. The second narrow portion 236 allows the pins 204 to move deeper within the radial holes 228 under the compressive force of the snap-ring 200. Once the snap-ring 200 assumes a diameter that is less than the diameter of the splined shaft 188, the lockable CV housing 180 may be slidably removed from the transaxle. It is contemplated, therefore, that loosening the actuator 212 to allow the snap-ring 200 to constrict deeper into the recess 196 may be utilized to uncouple the lockable CV housing 180 from the transaxle.

While the invention has been described in terms is of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A constant velocity housing to couple a constant velocity joint with a transaxle, the constant velocity housing comprising:

an elongate housing configured to retain a plunging constant velocity joint;
    a splined shaft coupled with the elongate housing;
        a snap-ring disposed within a circumferential recess at an end of the splined shaft;
        a lock pin slidably retained within the splined shaft and in mechanical communication with the snap-ring wherein the lock pin is a generally elongate member configured to move within a concentric hole extending along the length of the splined shaft and comprising a first narrow portion and a second narrow portion that share an intervening shaft portion; and
        an actuator in mechanical communication with the lock pin wherein the actuator includes threads configured to engage with similar threads disposed within a threaded hole that extends from the concentric hole to an exterior of the constant velocity housing.

2. The constant velocity housing of claim 1, wherein a rounded end comprising the actuator is configured to engage with the first narrow portion while a cylindrical spring biases the lock pin toward the end of the splined shaft.

3. The constant velocity housing of claim 2, wherein the rounded end is configured to fully extend into the first narrow portion when the actuator is fully tightened into the threaded hole, thereby positioning the second narrow portion away from the location of at least one or more pins.

4. The constant velocity housing of claim 3, wherein the lock pin is configured to push the one or more pins outward within radial holes and into contact with the snap-ring, thereby forcibly expanding the snap-ring within the circumferential recess and causing the snap-ring to assume a diameter that is greater than the diameter of the splined shaft such that the constant velocity housing may be coupled with the transaxle.

5. The constant velocity housing of claim 4, wherein the rounded end is configured to move out of the first narrow portion when the actuator is loosened, thereby allowing the cylindrical spring to push the lock pin toward the end of the splined shaft such that the second narrow portion is positioned near the location of the one or more pins.

6. The constant velocity housing of claim 5, wherein the second narrow portion is configured to allow the one or more pins to move deeper within the radial holes due to a compressive force of the snap-ring, thereby allowing the snap-ring to relax to a diameter that is substantially less than the diameter of the splined shaft such that the constant velocity housing may be decoupled from the transaxle.

\* \* \* \* \*